(12) United States Patent
Pardal et al.

(10) Patent No.: US 11,352,531 B2
(45) Date of Patent: Jun. 7, 2022

(54) TWO-COMPONENT POLYURETHANE ADHESIVE FOR LAMINATION

(71) Applicant: BOSTIK SA, Colombes (FR)

(72) Inventors: Francis Pardal, Venette (FR); David Penet, Venette (FR)

(73) Assignee: BOSTIK SA, Colombes (FR)

( * ) Notice: Subject to any disclaimer, the term of this patent is extended or adjusted under 35 U.S.C. 154(b) by 183 days.

(21) Appl. No.: 16/956,135

(22) PCT Filed: Dec. 10, 2018

(86) PCT No.: PCT/EP2018/084221
§ 371 (c)(1),
(2) Date: Jun. 19, 2020

(87) PCT Pub. No.: WO2019/121120
PCT Pub. Date: Jun. 27, 2019

(65) Prior Publication Data
US 2020/0325369 A1 Oct. 15, 2020

(30) Foreign Application Priority Data

Dec. 19, 2017 (FR) ...................................... 1762477

(51) Int. Cl.
| | | |
|---|---|---|
| *C09J 175/08* | (2006.01) | |
| *C08G 18/12* | (2006.01) | |
| *C08G 18/40* | (2006.01) | |
| *C08G 18/48* | (2006.01) | |
| *C08G 18/50* | (2006.01) | |
| *C08G 18/76* | (2006.01) | |
| *C08G 18/78* | (2006.01) | |
| *C08G 18/79* | (2006.01) | |
| *C08L 75/08* | (2006.01) | |
| *B32B 7/12* | (2006.01) | |
| *B32B 27/34* | (2006.01) | |

(Continued)

(52) U.S. Cl.
CPC .............. *C09J 175/08* (2013.01); *B32B 7/12* (2013.01); *B32B 15/085* (2013.01); *B32B 27/08* (2013.01); *B32B 27/32* (2013.01); *B32B 27/34* (2013.01); *B32B 27/36* (2013.01); *C08G 18/12* (2013.01); *C08G 18/4018* (2013.01); *C08G 18/4812* (2013.01); *C08G 18/5045* (2013.01); *C08G 18/7671* (2013.01); *C08G 18/7837* (2013.01); *C08G 18/79* (2013.01); *C08L 75/08* (2013.01); *B32B 2250/03* (2013.01); *B32B 2439/06* (2013.01); *C08L 2205/02* (2013.01)

(58) Field of Classification Search
CPC ...... C09J 175/04; C09J 175/08; C09J 175/14; C08G 18/12; C08G 18/50; C08G 18/40; C08G 18/4018; C08G 18/48; C08G 18/4812; C08G 18/5045; C08G 18/76; C08G 18/7671; C08G 18/7837; C08G 18/79; C08G 2190/00; C08G 18/10; C08G 18/36; C08G 18/307; C08G 18/4288; C08G 18/4891; C08G 18/6607; C08G 18/6629; C08G 18/7657; B32B 15/085; B32B 2250/03; B32B 2439/06; B32B 27/08; B32B 27/32; B32B 27/34; B32B 27/36; B32B 7/12; B32B 15/082; B32B 15/088; B32B 15/09; B32B 15/092; B32B 15/20; B32B 2255/10; B32B 2255/205; B32B 2307/748; B32B 2439/40; B32B 2439/70; B32B 27/10; B32B 27/302; B32B 27/304; B32B 27/306; B32B 27/308; B32B 27/38; C08L 2205/02; C08L 75/04; C08L 75/08

See application file for complete search history.

(56) References Cited

U.S. PATENT DOCUMENTS 7,288,213 B1 10/2007 Charriere et al.
9,453,152 B2 9/2016 Carlson et al.
(Continued)

FOREIGN PATENT DOCUMENTS

EP 2468788 B1 3/2018
WO 9955756 A1 11/1999
(Continued)

OTHER PUBLICATIONS

International Search Report PCT/EP2018/084221 dated Mar. 4, 2019 (pp. 1-2).

*Primary Examiner* — Yan Lan
(74) *Attorney, Agent, or Firm* — Millen White Zelano and Branigan, PC; Csaba Henter

(57) ABSTRACT

1) Two-component polyurethane-based adhesive composition comprising an —NCO component and an —OH component, such that:
  the —NCO component is obtained by polyaddition between MDI and a composition of polyols comprising a polyether diol and a polyether triol, in an —NCO/—OH molar equivalent ratio of between 2.5 and 6.5;
  the —OH component is obtained by polyaddition between MDI and a composition of polyols with a functionality of 2 comprising an aliphatic polyester diol, a partially aromatic polyester diol and an aliphatic polyether diol, in an —NCO/—OH molar equivalent ratio of between 0.05 0.50;
  the amounts of the —NCO and —OH components being such that the —NCO/—OH molar equivalent ratio is within a range extending from 1.5 to 1.7.
2) Multilayer film comprising 2 thin layers of material linked to one another by a continuous layer constituted by said crosslinked adhesive composition.
3) Process for preparing said film and use thereof in the manufacture of flexible packagings.

15 Claims, No Drawings

(51) Int. Cl.
*B32B 27/32* (2006.01)
*B32B 27/08* (2006.01)
*B32B 27/36* (2006.01)
*B32B 15/085* (2006.01)

(56) References Cited

U.S. PATENT DOCUMENTS

| | | | |
|---|---|---|---|
| 9,458,363 | B2 | 10/2016 | Kollbach et al. |
| 9,487,337 | B2 | 11/2016 | Sundaram et al. |
| 10,208,153 | B2 | 2/2019 | Shah et al. |
| 2015/0122407 | A1* | 5/2015 | Chartrel .................. C08K 3/36 156/227 |
| 2017/0369632 | A1 | 12/2017 | Pela et al. |
| 2019/0300766 | A1* | 10/2019 | Pardal ................ C08G 18/4277 |

FOREIGN PATENT DOCUMENTS

| | | |
|---|---|---|
| WO | 12142148 A1 | 10/2012 |
| WO | 13043652 A2 | 3/2013 |
| WO | 16142513 A1 | 9/2016 |

* cited by examiner

TWO-COMPONENT POLYURETHANE ADHESIVE FOR LAMINATION

The subject of the present invention is a solvent-free, two-component polyurethane-type adhesive composition, which is suitable for the lamination of thin layers of materials, in particular polymeric and/or metallic materials. The present invention also relates to a multilayer film comprising at least 2 thin layers of said materials bonded together by said crosslinked adhesive composition, and also to the use of said system for producing flexible packagings.

Flexible packagings intended for packaging the most diverse products, such as those produced by the food-processing, cosmetics or detergence industries, generally consist of several thin layers (in the form of sheets of films), the thickness of which is between 5 and 150 µm and which consist of various materials, such as paper, a metal (for example aluminium) or else of thermoplastic polymers. The corresponding complex (or multilayer) film, the thickness of which can range from 20 to 400 µm, makes it possible to combine the properties of the various individual layers of material (also described as "supports") and to thus provide the consumer with a set of characteristics suitable for the final flexible packaging, such as, for example:

- its visual appearance (notably that of the printed elements presenting the information relating to the packaged product and intended for the consumer),
- a barrier effect to atmospheric moisture or to gases, in particular to oxygen,
- contact with food without risk of toxicity or of modification to the organoleptic properties of the packaged foodstuffs,
- chemical resistance for certain products, such as ketchup or liquid soap,
- good resistance to high temperature, for example in the case of pasteurization.

To constitute the final packaging, the multilayer film is generally formed by heat sealing, at a temperature ranging from about 120 to 250° C., this last technique also being used for closing the packaging around the product intended for the consumer.

The various layers of materials of which the multilayer film is composed are combined or assembled by laminating during industrial lamination processes.

These processes use adhesives (or glues) and devices (or machines) designed for this purpose. The multilayer film thus obtained is itself often termed a "laminate".

These processes first of all comprise a step of coating the adhesive onto a first film of material, which consists of a deposit of a continuous layer of adhesive with a controlled thickness generally less than 10 µm, corresponding to an amount of adhesive (or basis weight) which is also controlled, generally not exceeding 10 g/m². This coating step is followed by a step of laminating a second film of material, which may be identical to or different from the first layer, consisting of the application under pressure of this second film onto the first film covered with the layer of adhesive.

The complex films are thus finally obtained in very large width format and are generally packaged by winding in the form of wide reels 1 m in diameter having, like the film that may store, a width of up to 2 m. These wide reels can be stored and transported, with a view to the use thereof, either directly by food-processing industries, for the purpose of packaging their product, or by converters (or laminators) which cut the film so as to reduce the width thereof and shape it so as to produce bags, themselves intended for packaging an article, for example by-processing industries.

Solvent-free, two-component polyurethane-type lamination adhesives are widely used as glue for the production of multilayer systems intended for the flexible packaging field. Indeed, these adhesives which contain neither organic solvent nor water have the advantage of being able to be used in industrial lamination operations at very high line speeds. This is precisely due to the fact that there is no organic solvent or water to be removed, which thus avoids an additional removal step by passing the laminate through an oven, or by any other means.

Solvent-free, two-component polyurethane-type lamination adhesives are supplied to the laminator, for implementation of the lamination process, in the form of 2 compositions (or components).

- one (known as —NCO component) containing chemical entities carrying isocyanate end groups, and
- the other (known as —OH component) containing chemical entities carrying hydroxyl end groups.

The mixing of these 2 components is carried out under hot conditions at a temperature of between 30 and 80° C. by the operator of the lamination machine (prior to starting it up), which makes possible, by virtue of an appropriate viscosity, the correct operation of the machine.

On conclusion of the coating of the mixture thus obtained and of the lamination process, the isocyanate groups of the —NCO component react with the hydroxyl groups of the —OH component, according to a reaction referred to as crosslinking, to form a polyurethane which exists in the form of a three-dimensional network comprising urethane groups, providing the cohesion of the adhesive seal between the 2 thin laminated layers. The appropriate time for completing this crosslinking reaction, and thus ensuring the required level of cohesion as a function of the subsequent treatment, is generally of the order of 1 to 10 days.

The complex films produced according to this type of process are very suitable for the production of flexible (or soft) packagings owing to their excellent level of cohesion.

The chemical entities present in the —OH component are generally polymeric or non-polymeric chemical compounds, sometimes of natural origin (such as castor oil), which generally include polymers of polyether polyol and/or polyester polyol type, with a molar mass of between 400 and 4000 g/mol.

The chemical entities present in the —NCO component are usually polymeric chemical compounds which are called prepolymers since they are precursors of the constituent final crosslinked polyurethane of the adhesive seal. These prepolymers comprising —NCO end groups are generally themselves polyurethanes produced by the polyaddition reaction of a molar excess of a diisocyanate monomer, which is often aromatic, with polyether polyols and/or polyester polyols.

However, for reasons which stem from the specificity of this polyaddition reaction and from the presence of the molar excess of the diisocyanate, a certain amount of unreacted diisocyanate monomer remains in the —NCO component thus obtained. These residual amounts of ("free") diisocyanate monomers of low molecular weight are capable of migrating through the multilayer film, after the use of the two-component adhesive, and therefore through the final flexible packaging. Thus, said compounds are capable of forming by hydrolysis, on contact with the water or moisture present in the foods or other products packaged, primary aromatic amines (PAAs), which are considered to be very harmful to human health and to the environment.

Just after the industrial operation for producing the complex film, the amount of PAA that can be extracted from said film is generally very high. This amount decreases over time, because of the continuation and then completion of the crosslinking reaction within the adhesive layer of the film, which has the effect of reducing the residual amount of free diisocyanate monomers and also the mobility thereof in the complex film and, consequently, the possibility of them migrating out of said film.

Thus, in order to adhere to the regulatory obligations, lamination manufacturers must, in practice, store the reels of laminated complexes, as long as the amount of PAA extractable from said complex is above 10 ppb, or even above 5 ppb. A storage time ranging up to 14 days or more may be necessary before the complex film can be used to produce flexible packagings intended for food products.

With the aim of improving industrial productivity, it is therefore very desirable to accelerate the decrease in the amount of extractable PAA.

Prior art documents which address the problem associated with PAAs are known.

Thus, PCT application WO 2013/043652 describes a layered structure comprising at least 2 layers, one formed from a composition comprising polyurethane, as adhesive layer, and the other, as support, formed from a composition comprising a polymer functionalized with an acid, anhydride or amine group which can trap free diisocyanate monomers. The supports used are however very specific.

International application WO2016/142513 discloses a polyurethane prepolymer comprising —NCO end groups, which has a low monomer content and can be used as —NCO component of a two-component polyurethane adhesive. Said prepolymer is obtained by reacting a polyol with an excess of polyisocyanate, then reacting, on the product of this reaction, a compound which has a function exhibiting an acidic hydrogen H, reactive with an —NCO group. The prepolymer exemplified is however a solvent-based adhesive.

U.S. Pat. No. 9,458,363 describes a polyurethane adhesive composition containing a prepolymer comprising —NCO end groups, obtained from polyols and from polyisocyanates, and a compound with a molecular weight of less than 2000 g/mol having functional groups that are reactive with primary amine groups. However, the adhesive compositions illustrated by this patent are all solvent-based.

International application WO 2012/142148 describes an adhesive lamination composition, the —NCO component of which is a polyurethane prepolymer comprising isocyanate end groups, obtained from a modified diphenylmethanediisocyanate.

It is however always desirable to enrich the technical solutions made available to lamination manufacturers.

Thus, an objective of the present invention is to provide a solvent-free, two-component polyurethane-type lamination adhesive which exhibits, from the time it is used in a lamination process, an improved decrease over time of the amount of PAA extractable from the complex films obtained by means of said process.

Another objective of the invention is to provide a solvent-free, two-component polyurethane-type lamination adhesive, the —NCO and —OH components of which have, each individually along with the composition obtained just after mixing thereof, a viscosity suitable for their use in lamination machines.

Another objective of the invention is to provide a solvent-free, two-component polyurethane-type lamination adhesive which is polyvalent, in the sense that it can be suitable for the supports normally used by laminators.

Another objective of the invention is to provide a solvent-free, two-component polyurethane-type lamination adhesive which results, after lamination, and in particular after lamination of metallic or metallized supports, in the obtaining of a complex film which has the required cohesion properties.

Another objective of the invention is to provide a solvent-free, two-component polyurethane-type lamination adhesive which results, after lamination, in the obtaining of a cohesive complex film after a shorter crosslinking time.

It has now been found that these objectives may be achieved, in total or in part, by means of the adhesive composition described below.

A subject of the present invention is therefore a two-component polyurethane-based adhesive composition comprising an —NCO component and an —OH component, such that:

the —NCO component is a composition A comprising polyurethane prepolymers A1 comprising at least two —NCO end groups, A1 being obtained by polyaddition reaction between:

a composition A1.C1 of diphenylmethanediisocyanate (MDI) comprising at least 35% by weight of the 4,4' elastomer, said percentage being expressed on the basis of the total weight of said composition, and a composition A1.C2 of polyols comprising a polyether diol $PE_A^1$ with a molar mass Mn of between 800 and 1200 g/mol and a polyether triol $PE_A^2$ with a molar mass Mn of between 350 and 550 g/mol, in an amount corresponding to a $PE_A^2/(PE_A^1+PE_A^2)$ weight/weight ratio of between 15 and 30%, the amounts of A1.C1 and A1.C2 used being such that the —NCO/—OH molar equivalent ratio is between 2.5 and 6.5;

the —OH component is a composition B comprising polyurethane prepolymers B1 comprising at least two —OH end groups, B1 being obtained by polyaddition reaction between:

a composition B1.C1 of diphenylmethanediisocyanate (MDI) comprising at least 35% by weight of the 4,4' elastomer, said percentage being expressed on the basis of the total weight of said composition, and a composition B1.C2 of polyols with a functionality of 2 comprising, on the basis of the total weight of said composition:

from 38 to 42% by weight of a composition B1.C2.D comprising an aliphatic polyester diol $PES_B^1$ with a molar mass Mn of between 800 and 1200 g/mol and a partially aromatic polyester diol $PES_B^2$ with a molar mass Mn of between 1000 and 1400 g/mol, in an amount corresponding to a $PES_B^1/PES_B^2$ weight/weight ratio of between 0.35 and 0.45; and from 58 to 62% by weight of an aliphatic polyether diol $PE_B$ with a molar mass Mn of between 350 and 550 g/mol;

the amounts of B1C1 and B1C2 used being such that the —NCO/—OH molar equivalent ratio is between 0.05 and 0.50;

it also being specified that the amounts of the —NCO and —OH components of said two-component adhesive composition are such that the —NCO/—OH molar equivalent ratio is within a range extending from 1.5 to 1.7.

It has now been found that the two-component adhesive composition according to the invention makes it possible to obtain a complex film with a reduced crosslinking time, the extractable PAA content of which is advantageously reduced below 5 ppb from the 2$^{nd}$ day following its production, which thus makes it possible for the laminators to reduce the storage time of their reels of complex films, and therefore their stocks of finished products. Furthermore, said film has cohesion properties that are entirely suitable and even excellent in the case where one of the supports of said film is a metallized support, such as for example a metallized PET.

The obtaining of these properties, for the complex film, is accompanied by easy use of the corresponding two-component adhesive composition, whether in terms of easy introduction, by means of a pump, of the —NCO and —OH components into the lamination machine, owing to the viscosity properties of said components, or further in terms of the use, in the lamination machine itself, of the composition resulting from mixing said components, here again owing to an appropriate viscosity profile, for said complex.

Finally, the combination of these advantageous properties is obtained for a two-component adhesive composition which is free of solvent.

—NCO Component:

The MDI composition A1.C1 used for the preparation of A1 comprises at least 35% by weight of the 4,4' isomer, on the basis of the total weight thereof, and preferably at least 45%.

Preferably, the 2,2' isomer content of said composition is less than 1% by weight, on the basis of the total weight thereof.

According to one embodiment, the composition A1.C1 comprises at least 49% by weight of the 4,4' isomer, and preferably at least 49% by weight of the 2,4' isomer. Such compositions are commercially available. Mention may for example be made of LUPRANAT® MIPI from the company Dow of which the 4,4' isomer content is at least 49.5% by weight, the 2,4' isomer content is at least 49.3% by weight, and the 2,2' isomer content is less than 0.2%. The percentage, expressed as weight/weight, of —NCO groups of this product is equal to 33.5%.

According to another embodiment, the composition A1.C1 comprises at least 95% by weight of the 4,4' isomer. Such compositions are also commercially available. Mention may for example be made of ISONATE® M125 from the company Dow of which the 4,4' isomer content is at least 97% by weight, and the 2,2' isomer content is less than 0.1%. The percentage of —NCO groups of this product (expressed by weight/weight) is equal to 33.6%.

The polyether diol $PE_A^1$ and the polyether triol $PE_A^2$ used in the polyol composition A1.C2 are preferably chosen from polyoxyalkylene diols and polyoxyalkylene triols, the linear or branched (saturated) alkylene part of which comprises from 2 to 4 carbon atoms, and preferably from 2 to 3 carbon atoms. Thus, polypropylene glycols (PPGs) with respective functionalities of 2 (for the polyether diol $PE_A^1$) and 3 (for the polyether triol $PE_A^2$) are most particularly preferred.

The abovementioned polyether diol and triol can be prepared conventionally and/or are widely commercially available. For example:

Voranol® 1010L, available from DOW CHEMICAL, is a polypropylene glycol (of diol type) with a number-average molecular weight of between 984 and 1058 g/mol, the hydroxyl number OHN of which is between 106 and 114 mgKOH/g;

Voranol® CP450, also available from DOW CHEMICAL, is a polypropylene glycol (of triol type) with an average molecular weight of between 425 and 455 g/mol, the hydroxyl number OHN of which is between 370 and 396 mgKOH/g;

The hydroxyl number of a polyol (denoted OHN) represents the number of hydroxyl functions per gram of polyol and is expressed in the form of the equivalent number of milligrams of potassium hydroxide (KOH) which are used in the quantitative determination of the hydroxyl functions. The OHN can be measured experimentally, for example according to the standard ISO 14900:2001.

According to one preferred variant, the polyol composition A1.C2 comprises the polyethers $PE_A^1$ and $PE_A^2$ in an amount corresponding to a $PE_A^2/(PE_A^1+PE_A^2)$ weight/weight ratio of between 18 and 24.

According to a further preferred variant, the polyol composition A1.C2 consists of the polyether diol $PE_A^1$ and polyether triol $PE_A^2$.

The polyaddition between the MDI composition A1.C1 and the polyol composition A1.C2 is generally carried out at a temperature of between 70 and 80° C. for a period ranging from 3 to 6 hours.

The amounts of A1.C1 and A1.C2 used in the polyaddition reaction are such that the —NCO/—OH molar equivalent ratio is between 2.5 and 6.5. The term "—NCO/—OH molar equivalent ratio" is intended to mean the ratio of the equivalent number of —NCO groups (present in A1.C1) to the equivalent number of —OH groups (present in A2.C2). Preferably, said ratio is between 3.0 and 5.5, and even more preferentially between 3.5 and 5.0.

Generally, the —NCO end group weight content of the polyurethane prepolymers A1 (expressed by weight of said groups per 100 g of A1) varies in the range extending from 9 to 18%.

According to a first embodiment of the composition A, said composition consists essentially, as —NCO component, of the polyurethane prepolymers A1 described above. The term "consists essentially" is intended to signify an A1 content of the composition A of at least 98%, and which can range up to 100%.

According to a second embodiment of the composition A, said composition also comprises, in addition to the polyurethane prepolymers A1, an aliphatic polyisocyanate A2, the —NCO end group functionality of which (expressed in number of moles of —NCO functions per mole of A2) is within a range extending from 2 to 3.5, and the —NCO content of which, expressed by weight of the basis of the weight of A2, is between 17 and 27%.

The term "aliphatic polyisocyanate" is intended to mean a polyisocyanate of which the —NCO end groups are directly linked to non-aromatic carbon atoms.

Preference is given to an aliphatic polyisocyanate A2 obtained by homo- or heterocondensation of aliphatic diisocyanate monomers, optionally with one or more compounds with a mobile hydrogen, such as for example an alcohol, a diol, an amine, and other analogous compounds. The term "homocondensation of diisocyanate monomers" is intended to mean a product resulting from the condensation of a diisocyanate monomer with itself. The term "heterocondensation of diisocyanate monomers" is intended to mean a product resulting from the condensation of at least two different diisocyanate monomers with one another, or from the condensation of a diisocyanate monomer and a compound with a mobile hydrogen.

Even more preferably, the aliphatic polyisocyanate A2 bears an allophanate function and is obtained according to conventional methods well known to those skilled in the art, by reacting at least one compound bearing a hydroxyl function and at least two diisocyanate monomers generally in the presence of a specific catalyst. Such allophanates can advantageously be prepared directly from an isocyanate and the desired alcohol, by heating in the presence of a catalyst of dibutyltin dilaurate type, as indicated in patent application WO 99/55756.

Such aliphatic polyisocyanates A2 are preferentially obtained from at least one polyisocyanate and at least one monoalcohol, and preferably a linear or branched alcohol comprising from 1 to 20 carbon atoms.

Preference is most particularly given to the allophanates obtained from the products of homocondensation and/or heterocondensation of aliphatic isocyanate monomers, and most particularly hexamethylenediisocyanate (or HDI) and/or HDI isocyanurate, also known as HDT (for hexamethylenediisocyanate trimer).

Among the commercially available products that can be used as aliphatic polyisocyanate A2, mention may be made of DESMODUR® XP 2860 from the company COVESTRO which is an aliphatic polyisocyanate based on hexamethylenediisocyanate (HDI) and which bears an allophanate function, the —NCO content of which is approximately 20% weight/weight and the —NCO end group functionality of which is within the range extending from 2 to 3.5.

In accordance with this second embodiment of the —NCO component, the content of A2 can vary in a range extending up to 15% by weight, on the basis of the total weight of the composition A. More preferably, the polyurethane prepolymer A1 content can then vary, on the basis of the total weight of the composition A, in a range extending from 83 to 98% on the basis of the total weight of the composition A, or else from 85 to 100%.

The composition A is then generally prepared by mixing the ingredients A1 and A2, at a temperature of approximately 80° C., under anhydrous conditions.

Advantageously, the total —NCO group content, expressed as % by weight on the basis of the total weight of the composition A, is within a range extending from 13 to 18%. This content, which can be evaluated by calculation from the amounts introduced into the preparation of the composition A, is also measured by chemical titration which uses the reaction of dicyclohexylamine with the isocyanate functions, then quantitative determination of the excess amine using hydrochloric acid.

—OH Component:

The —OH component is a composition B comprising polyurethane prepolymers B1 comprising at least two —OH end groups, B1 being obtained by a polyaddition reaction between between the composition B1.C2 of polyols with a functionality of 2 and the diphenylmethanediisocyanate (MDI) composition B1.C1. The latter composition comprises at least 35% by weight of the 4,4' isomer, said percentage being expressed on the basis of the total weight of said composition.

The composition B1.C1 corresponds to the same definition as the composition A1.C1 described above, and can also encompass the same preferred embodiments as the latter composition, given that the 2 compositions B1.C1 and A1.C1, when they are used in a two-component adhesive composition according to the invention, may be identical or different.

The composition B1.C2 of polyols with a functionality of 2 comprises, on the basis of the total weight of said composition:

from 38 to 42% by weight of a composition B1.C2.D comprising an aliphatic polyester diol $PES_B^1$ with a molar mass Mn of between 800 and 1200 g/mol and a partially aromatic polyester diol $PES_B^2$ with a molar mass Mn of between 1000 and 1400 g/mol, in an amount corresponding to a $PES_B^1/PES_B^2$ weight/weight ratio of between 0.35 and 0.45; and from 58 to 62% by weight of an aliphatic polyether diol $PE_B$ with a molar mass Mn of between 350 and 550 g/mol.

The aliphatic polyester diol $PES_B^1$ and partially aromatic polyester diol $PES_B^2$ can be chosen from:

polyester diols resulting from the polycondensation of at least one dicarboxylic acid (or optionally one of its corresponding anhydrides or diesters) with at least one diol, or else polyester diols resulting from a polymerization with ring opening of at least one cyclic lactone with at least one diol, such as polycaprolactone polyols.

The dicarboxylic acids that can be used for the synthesis of the abovementioned polyester diols are linear or branched, cyclic or acyclic, and saturated or unsaturated, and preferably comprise from 3 to 40 carbon atoms and more preferentially from 6 to 10 carbon atoms. Depending on whether they are intended for the synthesis of an aliphatic or partially aromatic polyester diol, said dicarboxylic acids are aliphatic or aromatic.

The diols that can be used for the synthesis of the abovementioned polyester diols can be chosen from polyalkylene diols, polyoxyalkylene diols and the mixtures of these compounds, the (saturated) alkylene part of these compounds preferably being linear or branched and preferably comprising from 2 to 40 carbon atoms and more preferentially from 2 to 8 carbon atoms.

The cyclic lactones that can be used for the synthesis of the abovementioned polyester diols preferably comprise from 3 to 7 carbon atoms.

The aliphatic polyester diol $PES_B^1$ partially aromatic polyester diol $PES_B^2$ can be prepared conventionally, and/or are widely commercially available. Mention may thus be made of:

DEKATOL® 3008 which is an aliphatic polyester diol available from the company BOSTIK, the number-average molecular weight of which is between 967 and 1039 g/mol, and the hydroxyl number OHN of which is between 108 and 116 mgKOH/g;

DEKATOL® 1105 which is a partially aromatic polyester diol available from the company BOSTIK, the number-average molecular weight of which is between 1069 and 1247 g/mol, and the hydroxyl number OHN of which is between 90 and 105 mgKOH/g.

According to one preferred variant, the composition B1.C2.D consists of the polyester diols $PES_B^1$ and $PES_B^2$.

The composition B1.C2 also comprises an aliphatic polyether diol $PE_B$ with a molar mass Mn of between 350 and 550 g/mol. Said polyether is chosen from polyoxyalkylene diols, the (saturated) linear or branched alkylene part of which comprises from 2 to 4 carbon atoms and more preferably from 2 to 3 carbon atoms. Thus, polypropylene glycols (PPGs) with respective functionalities of 2 are most particularly preferred.

Such polyether diols are widely commercially available. For example:

Voranol® P400, available from DOW CHEMICAL, is a polypropylene glycol diol with a number-average molecular weight of between 416 and 449 g/mol, and the hydroxyl number OHN of which is between 250 and 270 mgKOH/g.

According to one preferred variant, the composition B1.C2 consists of the composition B1.C2.D and of the polyether $PE_B$.

The polyaddition reaction between the MDI composition B1.C1 and the polyol composition B1.C2 is generally carried out at a temperature of between 70 and 80° C. for a period ranging from 3 to 6 hours.

The amounts of B1.C1 and B1.C2 used in the polyaddition reaction are such that the —NCO/—OH molar equivalent ratio is between 0.05 and 0.50, preferably between 0.1 and 0.4 and even more preferentially between 0.2 and 0.3. The term "—NCO/—OH molar equivalent ratio" is intended to mean the ratio of the equivalent number of —NCO groups (present in B1.C1) to the equivalent number of —OH groups (present in B2.C2).

According to one preferred embodiment of the composition B, said composition consists essentially, as —OH component, of the polyurethane prepolymers B1 described above. The term "consists essentially" is intended to signify a B1 content of the composition B of at least 98%, and which can range up to 100%.

Advantageously, the —OH group content, expressed as % by weight on the basis of the total weight of the composition B, is within a range extending from 3 to 5%.

This content can be evaluated by calculation from the weight amounts of the diols introduced with the composition B1.C2, the OHN of said diols, and the weight amount of MDI.

This content can also be determined experimentally by simply measuring the OHN of the composition B, in other words by determination of the amount of KOH (expressed in mg) required to neutralize the acetic acid formed after reaction of an excess of acetic anhydride with 1 g of composition B.

Two-Component Adhesive Composition:

The contents of the —NCO and —OH components in the two-component adhesive composition according to the invention are such that the —NCO/—OH molar equivalent ratio is within a range extending from 1.5 to 1.7. The term "—NCO/—OH molar equivalent ratio" is intended to mean the ratio of the equivalent number of —NCO groups (present in the —NCO component) to the equivalent number of —OH groups (present in the —OH component).

The viscosity, measured at 23° C., of each of the two —NCO and —OH components is advantageously less than or equal to 25 Pa·s. Said viscosity is also measured using a Brookfield viscometer according to the standard ISO 2555, published in 1999. Each of the 2 components, which are in practice stored separately in containers of suitable capacity (for example 200 l drums), can thus be conveniently introduced into the lamination machine by means of a pump.

The mixing of these 2 components, in the indicated ratio, is carried out under hot conditions at a temperature of between 40 and 80° C. by the operator of the lamination machine (prior to starting it up).

Advantageously, the viscosity, measured at 50° C., of the two-component adhesive composition thus obtained is, at the time of mixing, within a range extending from 500 to 2000 mPa·s, preferably from 500 to 1500 mPa·s. The viscosity of said adhesive composition is thus entirely suitable for use in a lamination machine and with correct operation thereof. The viscosity is measured using a Brookfield viscometer according to the standard ISO 2555, published in 1999.

The two-component adhesive composition according to the invention can also comprise additives that can be included in the —NCO component and/or in the —OH component, such as adhesion promoters (such as for example alkoxysilanes), rheological additives, catalysts or else plasticizers. The total content of these optional additives, in each of the —NCO and/or —OH components, can range up to 2% by weight, on the basis of the total weight of the component in question.

The two-component adhesive composition according to the invention is advantageously substantially free of solvent. These terms are intended to mean that the solvent content of said adhesive does not exceed 1% weight/weight, and preferably 0.05%.

Multilayer Film:

The invention also relates to a multilayer (or complex) film comprising 2 thin layers of material linked to one another by a continuous layer, characterized in that said layer is constituted by the two-component adhesive composition according to the invention in the crosslinked state, in an amount of less than 10 g/m$^2$.

According to one variant of the invention, said amount is less than or equal to 7 g/m$^2$, and is preferably within a range extending from 0.5 to 2.5 g/m$^2$, and even more preferentially ranging from 1 to 2 g/m$^2$.

The materials of which the thin layers surrounding the adhesive layer are made are generally chosen from paper, metal, such as for example aluminium, or thermoplastic polymers such as:
  polyethylene (PE),
  polypropylene (PP),
  a copolymer based on ethylene and propylene,
  polyamide (PA), in particular biaxially oriented polyamide (or OPA or BOPA),
  polyethylene terephthalate (PET), or else
  a copolymer based on ethylene, for instance a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
  polystyrene (PS),
  polyvinyl chloride (PVC),
  polyvinylidene fluoride (PVDF),
  a polymer or copolymer of lactic acid (PLA), or
  a polyhydroxyalkanoate (PHA).

The materials preferentially chosen to constitute the thin layers surrounding the adhesive layer are PE, PP, PET and PA.

Mention may also be made of a thin layer consisting of a thermoplastic polymer, preferentially PE and PP, covered with a single layer of 1 μm of aluminium, of alumina or silica.

The thickness of the 2 thin layers adjacent to the adhesive layer and of the other layers used in the multilayer film according to the invention is capable of varying within a wide range extending from 5 to 150 μm. The total thickness of said film is capable of also varying within a wide range extending from 20 to 400 μm.

The invention also relates to a process for continuously preparing the multilayer film as defined above, comprising the sequential steps of:

(i) combining the —NCO and —OH components in the form of an adhesive mixture made flowable by heating at a suitable temperature, (ii) coating, with said adhesive mixture, a first thin layer of material in the form of a substantially continuous layer, (iii) laminating a second thin layer, on the first thin layer coated in accordance with step (i), then (iv) crosslinking the adhesive mixture.

Finally, the invention relates to the use of the multilayer film according to the invention for the production of flexible packagings. Specifically, the complex films according to the invention may be used for the production of very varied flexible packagings, which are formed and then closed (after the step of packaging the product intended for the consumer) via heat-sealing (or heat-welding) techniques.

The invention is now described in the following implementational examples, which are given purely by way of illustration and should not be interpreted in order to limit the scope thereof.

EXAMPLE 1 (REFERENCE): —NCO COMPONENT—PREPARATION OF A COMPOSITION A CONSISTING OF POLYURETHANE PREPOLYMERS A1

The following are placed, under a nitrogen stream and at ambient temperature, in a closed 1 litre reactor equipped with a stirrer, heating means and a temperature probe, and connected to a vacuum pump: 519.12 g of LUPRANAT® MIPI, 220.74 g of Voranol® 1010L, 60.08 g of Voranol® CP450 and 0.08 g of phosphoric acid (solution at 85%).

These amounts of reagents correspond to an —NCO/—OH molar equivalent ratio equal to 4.94.

The mixture is then heated to 80° C. with mechanical stirring and maintained at this temperature for 4 hours, which reaction time makes it possible to achieve a weight content of NCO functions (monitored by potentiometric titration) of 17.5% (weight/weight).

Particular attention is paid to the monitoring of the temperature which must not exceed 80° C. For that, the polyols are added portionwise (exothermia checked between each addition of polyol).

Once the reaction is complete, the reaction medium is then cooled to 40° C. and maintained at a reduced pressure of 20 mbar in order to degas the mixture.

The weight of reagents/ingredients introduced is related back to the total weight of the composition A and indicated as a percentage in Table 1.

The Brookfield viscosity at 23° C. is measured and the value obtained is shown in Table 1.

EXAMPLE 2 (REFERENCE): —NCO COMPONENT—PREPARATION OF A COMPOSITION A CONSISTING OF POLYURETHANE PREPOLYMERS A1

Example 1 is repeated while modifying the reagent weights so as to obtain an —NCO/—OH molar equivalent ratio of 3.67 (cf Table 1).

The —NCO function content of the polyurethane prepolymers A1 obtained and the Brookfield viscosity at 23° C. are also indicated in Table 1.

EXAMPLE 3 (REFERENCE): —NCO COMPONENT—PREPARATION OF A COMPOSITION A CONSISTING OF POLYURETHANE PREPOLYMERS A1 AND OF AN ALIPHATIC POLYISOCYANATE A2

Example 1 is repeated while replacing the LUPRANAT® MIPI with ISONATE® M125 and modifying the reagent weights so as to obtain the —NCO/—OH molar equivalent ratio indicated in the table.

The —NCO function content of the polyurethane prepolymers A1 obtained is 13.9% (indicated in Table 1).

Once the level of —NCO functions of A1 has reached the indicated value, 80.00 g of DESMODUR® XP 2860 are introduced. The mixture is kept stirring at a temperature of between 70 and 80° C. for 1 hour. The reaction medium is then cooled to 40° C. and maintained at a reduced pressure of 20 mbar in order to degas the mixture.

The weight content of —NCO functions of the composition A is 14.5% (weight/weight).

EXAMPLE 4 (REFERENCE): —OH COMPONENT—PREPARATION OF A COMPOSITION B CONSISTING OF POLYURETHANE PREPOLYMERS B1

The following are placed, under a nitrogen stream and at ambient temperature, in a closed 1 litre reactor equipped with a stirrer, heating means and a temperature probe, and connected to a vacuum pump: 80.00 g of DEKATOL® 3008, 208.00 g of DEKATOL® 1105 and 432.00 g of VORANOL® P400. The mixture is then heated to 80° C. with mechanical stirring and maintained at a reduced pressure of 20 mbar for one hour in order to dehydrate the polyols.

80.00 g of ISONATE® M125 are then introduced.

These amounts of reagents correspond to an —NCO/—OH molar equivalent ratio equal to 0.25.

The mixture is maintained at 80° C. for 4 hours, which reaction time makes it possible to achieve total consumption of the NCO functions, monitored by potentiometric titration.

Once the reaction is complete, the reaction medium is then cooled to 40° C. and maintained at a reduced pressure of 20 mbar in order to degas the mixture.

The amounts of reagents/ingredients introduced are related back to the total weight of the composition B and indicated as a percentage in Table 2.

The Brookfield viscosity at 23° C. is measured and the value obtained is indicated in Table 2.

The —OH function content of the polyurethane prepolymers B1 obtained and constituting the composition B, and also the Brookfield viscosity at 23° C. measured for the composition B, are also indicated in Table 2.

EXAMPLE 5 (ACCORDING TO THE INVENTION): TWO-COMPONENT ADHESIVE COMPOSITION OBTAINED BY MIXING THE —NCO COMPONENT OF EXAMPLE 1 AND THE —OH COMPONENT OF EXAMPLE 4

The —NCO component of Example 1 is mixed with the —OH component of Example 4 in an —NCO/—OH molar equivalent ratio equal to 1.65, which corresponds to an —NCO component/—OH component weight ratio equal to 100 g of —NCO component for 110 g of —OH component.

The mixing is carried out at a temperature of 50° C. in the lamination machine feed tank and the Brookfield viscosity is measured at this same temperature as soon as the mixing is performed.

The corresponding data are indicated in Table 3.

EXAMPLES 6 AND 7 (ACCORDING TO THE INVENTION): TWO-COMPONENT ADHESIVE COMPOSITION OBTAINED BY MIXING THE —NCO COMPONENT OF EXAMPLE 2 (RESPECTIVELY OF EXAMPLE 3) AND THE —OH COMPONENT OF EXAMPLE 4

Example 5 is repeated with the —NCO component of example 1 being replaced with the —NCO component of Example 2 (respectively of Example 3).

The values of the —NCO/—OH molar equivalent ratio and of the —NCO component/—OH component weight ratio are indicated in Table 3 with the Brookfield viscosity measured at 50° C.

EXAMPLE 8 (ACCORDING TO THE INVENTION): THREE-LAYER FILM OF WHICH THE ADHESIVE LAYER BONDS AN OPA LAYER AND A PE LAYER

A biaxially-oriented-polyamide film 15 μm thick is used for the PA layer and a polyethylene film 50 μm thick is used for the PE layer.

This three-layer film is obtained by feeding the tank of a lamination machine of Nordmeccanica type with the two-component adhesive composition of Example 5.

Said lamination machine is provided with a coating device of role type with an open tank operating at a temperature of 50° C. and at a rate of forward progression of 50 m/minute; the adhesive layer bonding the PA and PE layers has a thickness ranging from 2 g/m².

Immediately after its production, this three-layer film is stored at a temperature of 23° C. and under an atmosphere at 50% relative humidity (RH).

This three-layer film is subjected to the following tests:

A. Determination of the Crosslinking Time:

A.1. Principle of the Test:

The objective of this test is to measure the time (expressed in days) required for the crosslinking of the constituent two-compound adhesive of the adhesive layer of the three-layer film, starting from the production of said film by lamination.

This time is evaluated by the number of days required for the film to be sufficiently cohesive, and more specifically for the cohesion of said film, measured by means of the 180° peel test (described below), to be greater than a reference value equal to 3 N/15 mm.

A.2. Sampling of the Film:

A sample is taken each day from the three-layer film which is kept under the storage conditions at 23° C. and 50% RH specified above. This sample is subjected to a 180° peel test.

A.3. Description of the 180° Peel Test:

The 180° peel test is as described in the French standard NF T 54-122. The principle of this test consists in determining the force necessary to separate (or peel) 2 individual layers of films bonded by the two-component adhesive.

A test specimen of rectangular shape 15 mm wide and approximately 10 cm long is cut out from the two-layer film. The two individual layers of the film included in this strip are manually detached from the end of this test specimen, and over approximately 2 cm, and the 2 free ends thus obtained are attached to two holding devices respectively connected to a stationary part and a movable part of a tensile testing device which are located on a vertical axis.

While a drive mechanism imparts a uniform rate of 100 mm/minute to the movable part, resulting in the detachment of the 2 layers, the detached ends of which gradually move along a vertical axis with the formation of an angle of 180°, the stationary part—connected to a dynamometer—measures the force withstood by the test specimen thus held, which force is measured in N/15 mm.

A.4. Result:

The crosslinking time is 2 days.

B. Determination of the Cohesion:

A sample is taken from the three-layer film, which is maintained under the storage conditions at 23° C. and 50% RH specified above, after 30 days of storage.

This sample is subjected to the 1800 peel test described in A.3.

The cohesion is 6.55 N/15 mm.

C. Determination of the Amount of Primary Aromatic Amines (PAAs):

A sample is taken from the three-layer film, which is maintained under the storage conditions at 23° C. and 50% RH specified above, after 1 day of storage, then after 2 days of storage.

The three-layer film thus sampled is shaped into 20 cm-sided square-shaped bags by heat-sealing on 3 sites, one side remaining open The bags are filled with 200 ml of an aqueous acetic acid solution (3% by weight).

The bags are then heat-sealed and placed in an oven for 2 h at 70° C.

The bags are then opened, in order to extract therefrom the aqueous solution and to analyse it.

The PAAs are quantitatively determined by UV spectrometry at 550 nm, after diazotation and reaction with N-naphthyl-1-ethylenediamine hydrochloride, then concentration of the colour on a solid-phase column.

The result is expressed in mg of aniline per kg of the aqueous acetic acid solution packaged in the bags, and presented in ppb.

The following is obtained after 1 day of storage of the three-layer film: 18 ppb.

The following is obtained after 2 days of storage of the three-layer film: 3 ppb.

EXAMPLES 9 AND 10 (ACCORDING TO THE INVENTION): THREE-LAYER FILM OF WHICH THE ADHESIVE LAYER BONDS AN OPA LAYER AND A PE LAYER

Example 8 is repeated, with the two-component adhesive composition of Example 5 being replaced with that, respectively, of Example 6 and Example 7.

The crosslinking time, the cohesion and the amount of PAA of the corresponding three-layer films are indicated in Table 3.

EXAMPLE 11 (ACCORDING TO THE INVENTION): THREE-LAYER FILM OF WHICH THE ADHESIVE LAYER BONDS A METALLIZED-PET LAYER AND A PE LAYER

A three-layer film is first of all produced by repeating Example 8, except that the biaxially-oriented-polyamide layer 15 μm thick is replaced with a layer 9 μm thick consisting of PET surface-metallized by an aluminium layer.

The cohesion of the three-layer film thus obtained is determined by repeating the protocol of section B of Example 8.

The cohesion is 1.74 N/15 mm.

EXAMPLES 12 AND 13 (ACCORDING TO THE INVENTION): THREE-LAYER FILM OF WHICH THE ADHESIVE LAYER BONDS A METALLIZED-PET LAYER AND A PE LAYER

Example 11 is repeated, with the two-component adhesive composition of Example 5 being replaced with that, respectively, of Example 6 and Example 7.

The cohesion of the three-layer film thus obtained is indicated in Table 3.

TABLE 1

Compositions A (—NCO component)

| | | Content (as % by weight/weight) | | |
|---|---|---|---|---|
| | Ingredients | Ex. 1 | Ex. 2 | Ex. 3 |
| Polyurethane prepolymers A1 | LUPRANAT ® MIPI | 64.89 | 57.80 | — |
| | ISONATE ® M125 | — | — | 52.00 |
| | VORANOL ® 1010L | 27.59 | 33.20 | 29.90 |
| | VORANOL ® CP450 | 7.51 | 9.00 | 8.10 |
| | —NCO/—OH equivalent ratio | 4.94 | 3.67 | 3.66 |
| | —NCO weight content (as %) | 17.5 | 13.8 | 13.9 |
| A2 | DESMODUR ® XP 2860 | — | — | 10.00 |
| composition A | —NCO weight content (as %) | 17.5 | 13.8 | 14.5 |
| | Brookfield viscosity at 23° C. (mPa · s) | 2750 | 17 100 | 9100 |

TABLE 2 composition B (—OH component)

| | Ingredients | Content (as % by weight/weight) Example 4 |
|---|---|---|
| Polyurethane prepolymers B1 | ISONATE ® M125 | 10 |
| | DEKATOL ® 3008 | 10 |
| | DEKATOL ® 1105 | 26 |
| | VORANOL ® P400 | 54 |
| | —NCO/—OH equivalent ratio | 0.25 |
| composition B | —OH weight content (as %) | 3.9 |
| | Brookfield viscosity at 23° C. (mPa · s) | 13 600 |

TABLE 3

Two-component adhesive compositions

| | | Example 5 | Example 6 | Example 7 |
|---|---|---|---|---|
| —NCO Component | | Example 1 | Example 2 | Example 3 |
| —OH Component | | Example 4 | Example 4 | Example 4 |
| —NCO/—OH molar equivalent ratio | | 1.65 | 1.59 | 1.50 |
| —NCO component/ —OH component weight ratio | | 100/110 | 100/90 | 100/100 |
| Brookfield viscosity at 50° C. (mPa · s) | | 984 | 1,260 | 1,030 |
| Trilayer with PA/PE | Crosslinking time (in days) | 2 | 1 | 1 |
| | Cohesion (in N/15 mm) | 6.55 | 5.04 | 6.1 |
| | PAA after 1 day of storage (in ppb) | 18 | 18 | 13 |
| | PAA after 2 days of sotrage (in ppb) | 3 | <2 | 3 |
| Trilayer with metPET/PE | Cohesion (in N/15 mm) | 1.74 | 1.43 | 1.4 |

The invention claimed is:

1. Two-component polyurethane-based adhesive composition comprising an —NCO component and an —OH component, such that:

the —NCO component is a composition A comprising polyurethane prepolymers A1 comprising at least two —NCO end groups, A1 being obtained by polyaddition reaction between:

a composition A1.C1 of diphenylmethanediisocyanate (MDI) comprising at least 35% by weight of the 4,4' elastomer, said percentage being expressed on the basis of the total weight of said composition, and a composition A1.C2 of polyols comprising a polyether diol $PE_A^1$ with a molar mass Mn of between 800 and 1200 g/mol and a polyether triol $PE_A^2$ with a molar mass Mn of between 350 and 550 g/mol, in an amount corresponding to a $PE_A^2/(PE_A^1+PE_A^2)$ weight/weight ratio of between 15 and 30%, the amounts of A1.C1 and A1.C2 used being such that the —NCO/—OH molar equivalent ratio is between 2.5 and 6.5;

the —OH component is a composition B comprising polyurethane prepolymers B1 comprising at least two —OH end groups, B1 being obtained by polyaddition reaction between:

a composition B1.C1 of diphenylmethanediisocyanate (MDI) comprising at least 35% by weight of the 4,4' elastomer, said percentage being expressed on the basis of the total weight of said composition, and a composition B1.C2 of polyols with a functionality of 2 comprising, on the basis of the total weight of said composition:

from 38 to 42% by weight of a composition B1.C2.D comprising an aliphatic polyester diol $PES_B^1$ with a molar mass Mn of between 800 and 1200 g/mol and a partially aromatic polyester diol $PES_B^2$ with a molar mass Mn of between 1000 and 1400 g/mol, in an amount corresponding to a $PES_B^1/PES_B^2$ weight/weight ratio of between 0.35 and 0.45; and from 58 to 62% by weight of an aliphatic polyether diol $PE_B$ with a molar mass Mn of between 350 and 550 g/mol;

the amounts of B1C1 and B1C2 used being such that the —NCO/—OH molar equivalent ratio is between 0.05 and 0.50;

it also being specified that the amounts of the —NCO and —OH components of said two-component adhesive composition are such that the —NCO/—OH molar equivalent ratio is within a range extending from 1.5 to 1.7.

2. Two-component adhesive composition according to claim 1, characterized in that the 2,2' isomer content of the MDI composition A1.C1 used in the preparation of A1 is less than 1% by weight, on the basis of the total weight thereof.

3. Two-component adhesive composition according to claim 1, characterized in that the MDI composition A1.C1 comprises at least 49% by weight of the 4,4' isomer.

4. Two-component adhesive composition according to claim 1, characterized in that the polyether diol $PE_A^1$ and the polyether triol $PE_A^2$ used in the polyol composition A1.C2 are propylene glycols with the respective functionalities 2 and 3.

5. Two-component adhesive composition according to claim 1, characterized in that the —NCO end group weight content of the polyurethane prepolymers A1 varies in a range extending from 9 to 18%.

6. Two-component adhesive composition according to claim 1, characterized in that the composition A, as —NCO component, consists essentially of the polyurethane prepolymers A1.

7. Two-component adhesive composition according to claim 1, characterized in that the composition A, as —NCO component, also comprises an aliphatic polyisocyanate A2, the —NCO end group functionality of which is within a range extending from 2 to 3.5 and the —NCO content of which, expressed by weight on the basis of the weight of A2, is between 17 and 27%.

8. Two-component adhesive composition according to claim 7, characterized in that the aliphatic polyisocyanate A2 bears an allophanate.

9. Two-component adhesive composition according to claim 1, characterized in that the total —NCO group content, expressed as % by weight on the basis of the total weight of the composition A, is within a range extending from 13 to 18%.

10. Two-component adhesive composition according to claim 1, characterized in that the —OH group content, expressed as % by weight on the basis of the total weight of the composition B, is within a range extending from 3 to 5%.

11. Two-component adhesive composition according to claim 1, characterized in that the viscosity, measured at 23° C., of each of the two —NCO and —OH components is less than or equal to 25 Pa·s.

12. Two-component adhesive composition according to claim 1, characterized in that the viscosity thereof, measured at 50° C., at the time of mixing its 2 components, is within a range extending from 500 to 2 000 Pa·s.

13. Multilayer film comprising 2 thin layers of material linked to one another by a continuous layer, characterized in that said layer is constituted by the two-component adhesive composition as defined in claim 1, in the crosslinked state, in an amount of less than 10 g/m².

14. Process for continuously preparing the multilayer film as defined in claim 13, comprising the sequential steps of:
 (i) combining the —NCO and —OH components in the form of an adhesive mixture made flowable by heating at a suitable temperature,
 (ii) coating, with said adhesive mixture, a first thin layer of material in the form of a substantially continuous layer,
 (iii) laminating a second thin layer, on the first thin layer coated in accordance with step (i), then
 (iv) crosslinking the adhesive mixture.

15. Flexible packaging comprising the multiplayer film according to claim 1.

* * * * *